United States Patent
Donahue et al.

(10) Patent No.: US 7,716,521 B1
(45) Date of Patent: May 11, 2010

(54) MULTIPLE-CORE, MULTITHREADED PROCESSOR WITH FLEXIBLE ERROR STEERING MECHANISM

(75) Inventors: Hunter S. Donahue, Cupertino, CA (US); Ricky C. Hetherington, Pleasanton, CA (US); Jimmy K. Lau, Santa Clara, CA (US)

(73) Assignee: Oracle America, Inc., Santa Clara, CA (US)

( * ) Notice: Subject to any disclaimer, the term of this patent is extended or adjusted under 35 U.S.C. 154(b) by 968 days.

(21) Appl. No.: 11/123,674

(22) Filed: May 6, 2005

(51) Int. Cl.
*G06F 11/00* (2006.01)
(52) U.S. Cl. .................................................. 714/11
(58) Field of Classification Search ................. 714/11
See application file for complete search history.

(56) References Cited

U.S. PATENT DOCUMENTS

| | | | | |
|---|---|---|---|---|
| 6,049,866 | A | * | 4/2000 | Earl ............................ 712/227 |
| 6,918,059 | B1 | | 7/2005 | Gaulten et al. |
| 7,137,028 | B2 | | 11/2006 | Smith |
| 7,512,724 | B1 | * | 3/2009 | Dennis et al. ................. 710/45 |
| 2004/0230865 | A1 | | 11/2004 | Balazich et al. |
| 2005/0066115 | A1 | * | 3/2005 | Simha et al. ................ 711/108 |
| 2006/0004942 | A1 | * | 1/2006 | Hetherington et al. ......... 711/3 |
| 2006/0020831 | A1 | | 1/2006 | Golla et al. |
| 2006/0031721 | A1 | | 2/2006 | Blanchard et al. |
| 2006/0056290 | A1 | * | 3/2006 | Hass ........................... 370/229 |

OTHER PUBLICATIONS

Sun Microsystems UltraSPARC IV Processor User's Manual Supplement, v1.0, Apr. 2004. (PDF online).

* cited by examiner

*Primary Examiner*—Scott T Baderman
*Assistant Examiner*—Jigar Patel
(74) *Attorney, Agent, or Firm*—Robert C Kowert; Meyertons, Hood, Kivlin, Kowert & Goetzel, P.C.

(57) ABSTRACT

A multiple-core, multithreaded processor including a flexible error steering mechanism. An integrated circuit may include processor cores. Each processor core is associated with a respective number of threads and is configured to issue a first instruction from one of the threads during one execution cycle and a second instruction from another one of the threads during a successive execution cycle. An error processing unit may be coupled to the processor cores and configured to detect an error condition corresponding to a data element external to the processor cores. In response to detecting the error condition, the error processing unit may convey an indication of the error to a selected processor core dependent upon an identifier of the selected core. The error indication may also include an identifier of a selected thread executable on the selected processor core. The identifiers of the selected core and the selected thread may be programmable.

20 Claims, 6 Drawing Sheets

To/from crossbar

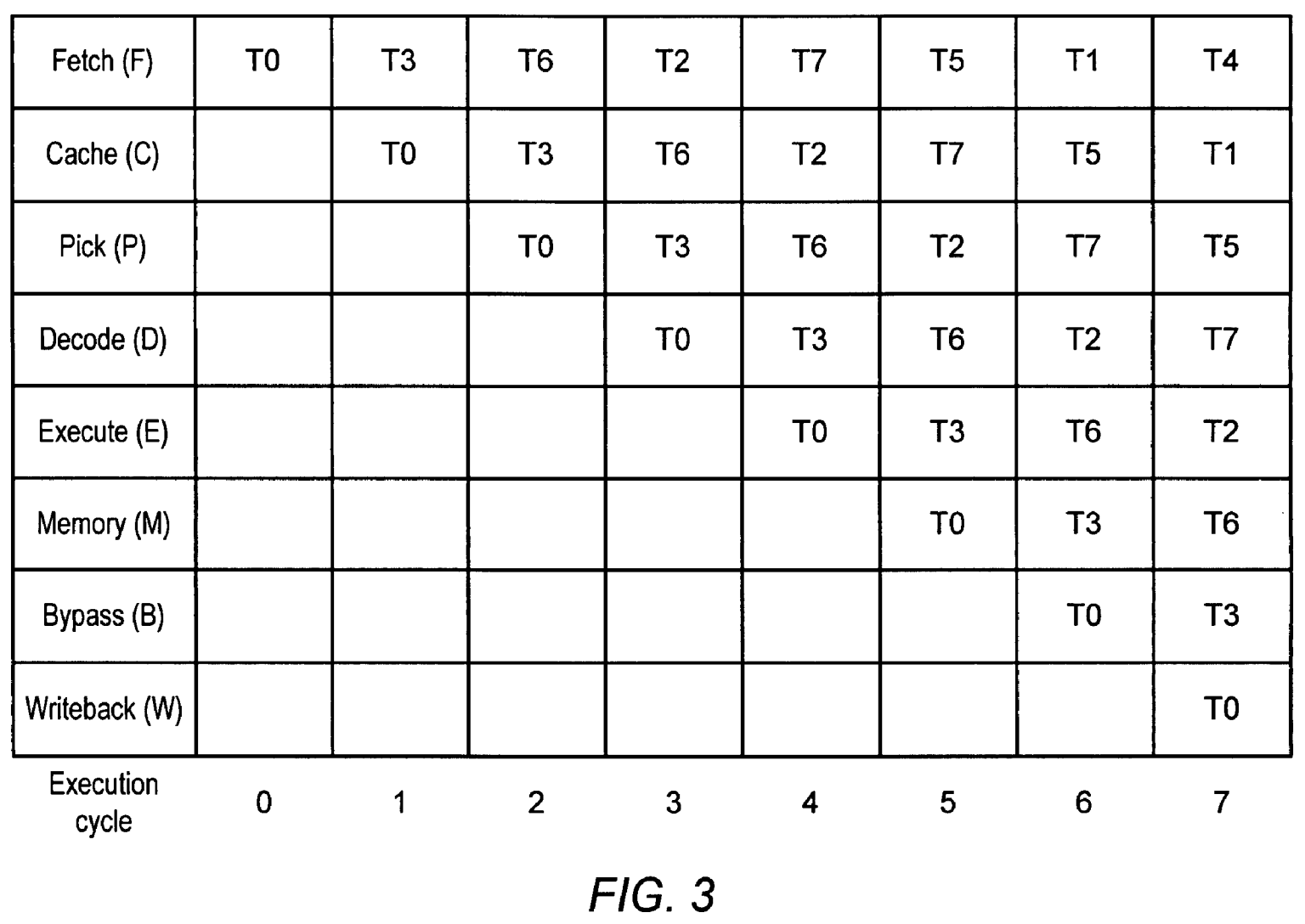

| | 0 | 1 | 2 | 3 | 4 | 5 | 6 | 7 |
|---|---|---|---|---|---|---|---|---|
| Fetch (F) | T0 | T3 | T6 | T2 | T7 | T5 | T1 | T4 |
| Cache (C) | | T0 | T3 | T6 | T2 | T7 | T5 | T1 |
| Pick (P) | | | T0 | T3 | T6 | T2 | T7 | T5 |
| Decode (D) | | | | T0 | T3 | T6 | T2 | T7 |
| Execute (E) | | | | | T0 | T3 | T6 | T2 |
| Memory (M) | | | | | | T0 | T3 | T6 |
| Bypass (B) | | | | | | | T0 | T3 |
| Writeback (W) | | | | | | | | T0 |
| Execution cycle | | | | | | | | |

FIG. 3

MULTIPLE-CORE, MULTITHREADED PROCESSOR WITH FLEXIBLE ERROR STEERING MECHANISM

BACKGROUND OF THE INVENTION

1. Field of the Invention

This invention relates to processors, and more particularly, to techniques for handling data errors within a processor.

2. Description of the Related Art

As semiconductor feature sizes shrink, processor data elements based on such features (e.g., random access memory (RAM) bit cells) become increasingly susceptible to transient or permanent errors. For example, environmental radiation such as cosmic rays or stray electromagnetic fields may couple sufficient energy to a data element to temporarily alter a value being stored or transmitted by the element. Further, electrostatic discharge or manufacturing flaws may cause a data element to permanently malfunction.

Although some such data errors may not impact operation of a system (for example, if they occur in a line of a data cache that is unallocated), in other instances, such errors may result in unstable or incorrect system operation, data loss, or other negative consequences. Consequently, critical data structures within a processor or processor core may be protected against undetected errors through the use of error detection and/or correction schemes. Detected errors may then be handled, e.g., by system software executing on the processor or processor core, in a programmatic way.

However, in a highly integrated processor including multiple processor cores configured to execute multiple threads as well as system components (e.g., peripherals, interfaces, etc.) external to the processor cores, there may exist data elements external to the processor cores for which error conditions may be detected. In a fine-grained multithreaded, multiple-core environment, it is ambiguous as to how errors occurring externally to processor cores may be efficiently and flexibly handled.

SUMMARY

A multiple-core, multithreaded processor including a flexible error steering mechanism is disclosed. In one embodiment, an integrated circuit may include a number of processor cores, where each of the processor cores is associated with a respective number of threads, and where each of the processor cores is configured to issue a first instruction from one of the respective threads during one execution cycle and to issue a second instruction from another one of the respective threads during a successive execution cycle. The integrated circuit may also include an error processing unit coupled to the processor cores and configured to detect an error condition corresponding to a data element external to the processor cores. In response to detecting the error condition, the error processing unit may be further configured to convey an indication of the error condition to a selected one of the processor cores dependent upon an identifier of the selected processor core. The error indication may also include an identifier of a selected thread executable on the selected processor core. The identifiers of the selected processor core and the selected thread may be programmable.

In one particular implementation of the integrated circuit, the indication of the error condition may include an error trap indication, and in response to receiving the error trap indication, the selected processor core may be configured to execute an error trap handler associated with the selected thread.

A method is further contemplated that in one embodiment may include selecting one of a number of processor cores to perform processing of an error condition occurring in a data element external to the processor cores, where each of the processor cores is associated with a respective plurality of threads, and where each of the processor cores is configured to issue a first instruction from one of the respective threads during one execution cycle and to issue a second instruction from another one of the respective threads during a successive execution cycle. The method may also include selecting one of the threads associated with the selected processor core to perform processing of the error condition and programming respective identifiers of the selected processor core and the selected thread. The method may further include detecting the error condition corresponding to the data element external to the plurality of processor cores and conveying an indication of the error condition to the selected processor core dependent upon the programmed respective identifier of the selected processor core.

BRIEF DESCRIPTION OF THE DRAWINGS

Other aspects of the invention will become apparent upon reading the following detailed description and upon reference to the accompanying drawings in which:

FIG. 3 is a pipeline diagram illustrating the flow of instructions through one embodiment of a processor core.

Figure 1:
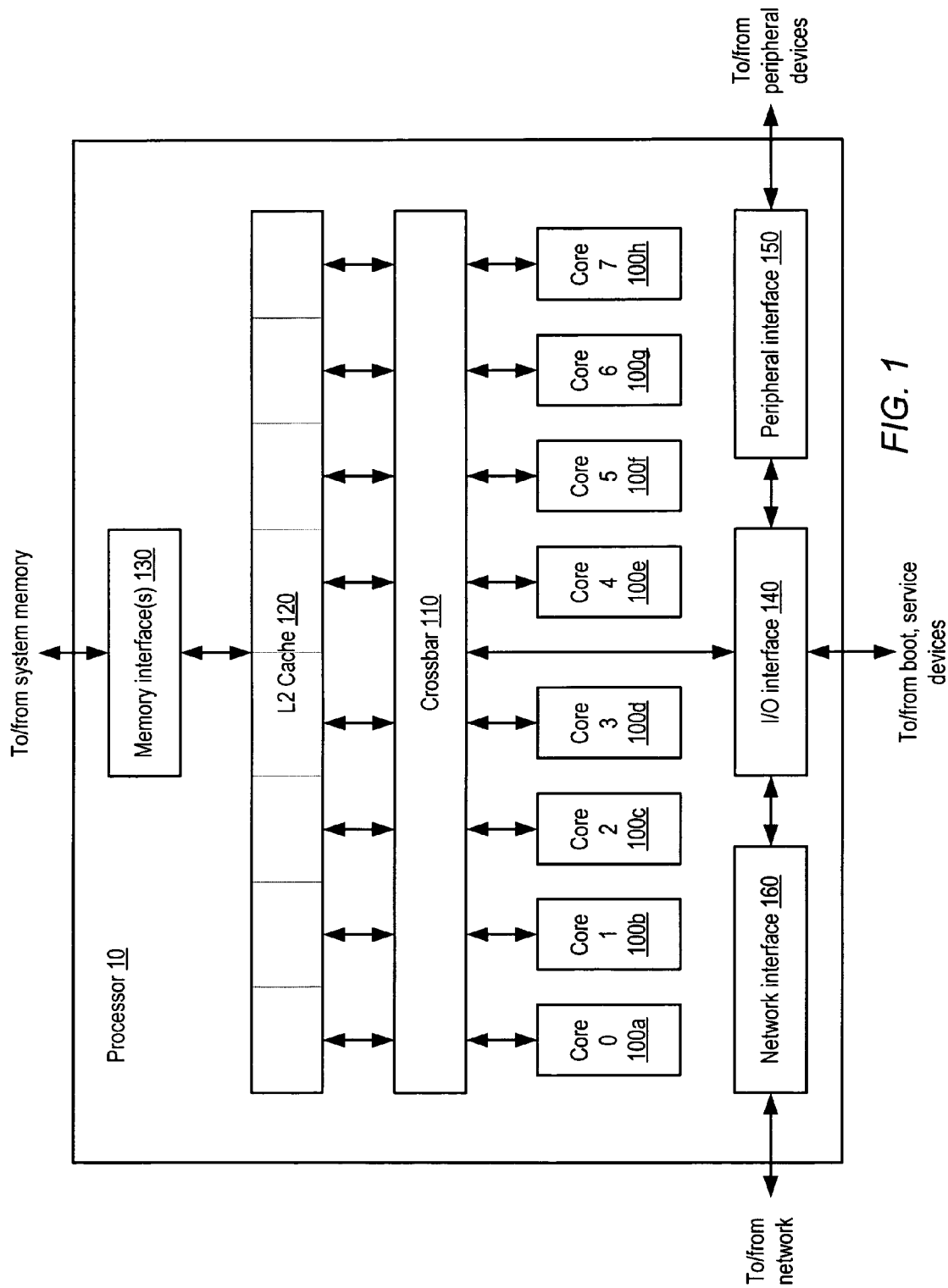
FIG. 1 is a block diagram illustrating one embodiment of a multithreaded processor.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION OF EMBODIMENTS

Overview of Multithreaded Processor Architecture

A block diagram illustrating one embodiment of a multithreaded processor 10 is shown in FIG. 1. In the illustrated embodiment, processor 10 includes a plurality of processor cores 100a-h, which are also designated "core 0" though "core 7". Each of cores 100 is coupled to an L2 cache 120 via a crossbar 110. L2 cache 120 is coupled to one or more memory interface(s) 130, which are coupled in turn to one or more banks of system memory (not shown). Additionally, crossbar 110 couples cores 100 to input/output (I/O) interface 140, which is in turn coupled to a peripheral interface 150 and a network interface 160. As described in greater detail below, I/O interface 140, peripheral interface 150 and network interface 160 may respectively couple processor 10 to boot and/or service devices, peripheral devices, and a network.

Cores 100 may be configured to execute instructions and to process data according to a particular instruction set architecture (ISA). In one embodiment, cores 100 may be configured to implement the SPARC® V9 ISA, although in other embodiments it is contemplated that any desired ISA may be employed, such as x86, PowerPC® or MIPS®, for example. In the illustrated embodiment, each of cores 100 may be configured to operate independently of the others, such that all cores 100 may execute in parallel. Additionally, as described below in conjunction with the descriptions of FIG. 2 and FIG. 3, in some embodiments each of cores 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In one embodiment, each of cores 100 may be configured to concurrently execute instructions from eight threads, for a total of 64 threads concurrently executing across processor 10. However, in other embodiments it is contemplated that other numbers of cores 100 may be provided, and that cores 100 may concurrently process different numbers of threads.

Crossbar 110 may be configured to manage data flow between cores 100 and the shared L2 cache 120. In one embodiment, crossbar 110 may include logic (such as multiplexers or a switch fabric, for example) that allows any core 100 to access any bank of L2 cache 120, and that conversely allows data to be returned from any L2 bank to any core 100. Crossbar 110 may be configured to concurrently process data requests from cores 100 to L2 cache 120 as well as data responses from L2 cache 120 to cores 100. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple cores 100 attempt to access a single bank of L2 cache 120 or vice versa.

L2 cache 120 may be configured to cache instructions and data for use by cores 100. In the illustrated embodiment, L2 cache 120 may be organized into eight separately addressable banks that may each be independently accessed, such that in the absence of conflicts, each bank may concurrently return data to a respective core 100. In some embodiments, each individual bank may be implemented using set-associative or direct-mapped techniques. For example, in one embodiment, L2 cache 120 may be a 4 megabyte (MB) cache, where each 512 kilobyte (KB) bank is 16-way set associative with a 64-byte line size, although other cache sizes and geometries are possible and contemplated. L2 cache 120 may be implemented in some embodiments as a writeback cache in which written (dirty) data may not be written to system memory until a corresponding cache line is evicted.

In some embodiments, L2 cache 120 may implement queues for requests arriving from and results to be sent to crossbar 110. Additionally, in some embodiments L2 cache 120 may implement a fill buffer configured to store fill data arriving from memory interface 130, a writeback buffer configured to store dirty evicted data to be written to memory, and/or a miss buffer configured to store L2 cache accesses that cannot be processed as simple cache hits (e.g., L2 cache misses, cache accesses matching older misses, accesses such as atomic operations that may require multiple cache accesses, etc.). L2 cache 120 may variously be implemented as single-ported or multiported (i.e., capable of processing multiple concurrent read and/or write accesses). In either case, L2 cache 120 may implement arbitration logic to prioritize cache access among various cache read and write requestors.

Memory interface 130 may be configured to manage the transfer of data between L2 cache 120 and system memory, for example in response to L2 fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2 Synchronous Dynamic Random Access Memory (DDR/DDR2 SDRAM), or Rambus® DRAM (RDRAM®), for example. In some embodiments, memory interface 130 may be configured to support interfacing to multiple different types of system memory.

In the illustrated embodiment, processor 10 may also be configured to receive data from sources other than system memory. I/O interface 140 may be configured to provide a central interface for such sources to exchange data with cores 100 and/or L2 cache 120 via crossbar 110. In some embodiments, I/O interface 140 may be configured to coordinate Direct Memory Access (DMA) transfers of data between network interface 160 or peripheral interface 150 and system memory via memory interface 130. In addition to coordinating access between crossbar 110 and other interface logic, in one embodiment I/O interface 140 may be configured to couple processor 10 to external boot and/or service devices. For example, initialization and startup of processor 10 may be controlled by an external device (such as, e.g., a Field Programmable Gate Array (FPGA)) that may be configured to provide an implementation- or system-specific sequence of boot instructions and data. Such a boot sequence may, for example, coordinate reset testing, initialization of peripheral devices and initial execution of processor 10, before the boot process proceeds to load data from a disk or network device. Additionally, in some embodiments such an external device may be configured to place processor 10 in a debug, diagnostic, or other type of service mode upon request.

Peripheral interface 150 may be configured to coordinate data transfer between processor 10 and one or more peripheral devices. Such peripheral devices may include, without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of an interface such as Peripheral Component Interface Express (PCI Express™), although it is contemplated that any suitable interface standard or combination of standards may be employed. For example, in some embodiments peripheral interface 150 may be configured to implement a version of Universal Serial Bus (USB) protocol or IEEE 1394 (Firewire®) protocol in addition to or instead of PCI Express™.

Network interface 160 may be configured to coordinate data transfer between processor 10 and one or more devices (e.g., other computer systems) coupled to processor 10 via a network. In one embodiment, network interface 160 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, network interface 160 may be configured to implement multiple discrete network interface ports.

Overview of Fine-Grained Multithreading Processor Core

As mentioned above, in one embodiment each of cores 100 may be configured for multithreaded execution. More specifically, in one embodiment each of cores 100 may be configured to perform fine-grained multithreading, in which each core may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle.

Figure 2:
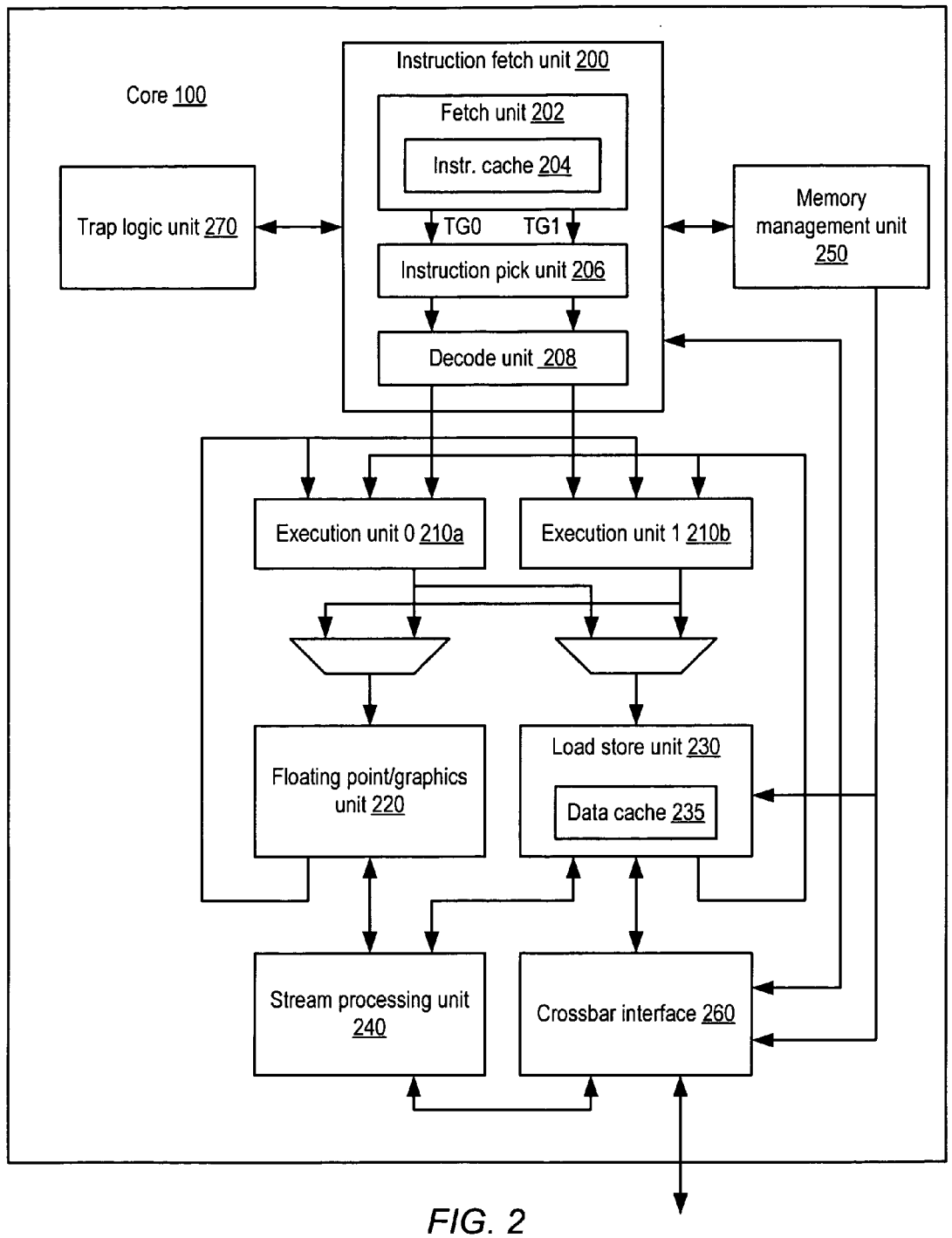
FIG. 2 is a block diagram illustrating one embodiment of a processor core.

One embodiment of core 100 configured to perform fine-grained multithreading is illustrated in FIG. 2. In the illustrated embodiment, core 100 includes an instruction fetch unit (IFU) 200 coupled to a memory management unit (MMU) 250, a crossbar interface 260, a trap logic unit (TLU) 270, and a plurality of execution units (EXU0, EXU1) 210*a-b*. (Execution units 210*a-b* may also be referred to generically as EXUs 210.) Each of execution units 210*a-b* is coupled to both a floating point/graphics unit (FGU) 220 and a load store unit (LSU) 230. Each of the latter units is also coupled to send data back to each of execution units 210*a-b*. Both FGU 220 and LSU 230 are coupled to a stream processing unit (SPU) 240. Additionally, LSU 230, SPU 240 and MMU 250 are coupled to crossbar interface 260, which is in turn coupled to crossbar 110 shown in FIG. 1.

Instruction fetch unit 200 may be configured to provide instructions to the rest of core 100 for execution. In the illustrated embodiment, IFU 200 includes a fetch unit 202, an instruction pick unit 206, and a decode unit 208. Fetch unit 202 further includes an instruction cache 204. In one embodiment, fetch unit 202 may include logic to maintain fetch addresses (e.g., derived from program counters) corresponding to each thread being executed by core 100, and to coordinate the retrieval of instructions from instruction cache 204 according to those fetch addresses. In some embodiments, instruction cache 202 may include fewer access ports than the number of threads executable on core 100, in which case fetch unit 202 may implement arbitration logic configured to select one or more threads for instruction fetch during a given execution cycle. For example, fetch unit 202 may implement a least-recently-fetched algorithm to select a thread to fetch. Fetch unit 202 may also implement logic to handle instruction cache misses and translation of virtual instruction fetch addresses to physical addresses (e.g., fetch unit 202 may include an Instruction Translation Lookaside Buffer (ITLB)). Additionally, in some embodiments fetch unit 202 may include logic to predict branch outcomes and/or fetch target addresses, such as a Branch History Table (BHT), Branch Target Buffer (BTB), or other suitable structure, for example.

In one embodiment, fetch unit 202 may be configured to maintain a pool of fetched, ready-for-issue instructions drawn from among each of the threads being executed by core 100. For example, fetch unit 202 may implement a respective instruction buffer corresponding to each thread in which several recently-fetched instructions from the corresponding thread may be stored. In one embodiment, instruction pick unit 206 may be configured to select one or more instructions to be decoded and issued to execution units 210. In the illustrated embodiment, the threads fetched by fetch unit 202 may be divided into two thread groups denoted TG0 and TG1 (for example, if core 100 implements eight threads, each of TG0 and TG1 may include four threads).

Pick unit 206, in the illustrated embodiment, may be configured to attempt to select one instruction to schedule for execution from each of TG0 and TG1, such that two instructions may be selected for execution during a given execution cycle. For example, pick unit 206 may employ a least-recently-picked (LRP) algorithm in which the least recently picked thread within a given thread group that is ready for execution is selected. It is noted that in one embodiment, thread fetching as performed by fetch unit 202 and instruction selection as performed by pick unit 206 may be largely independent of one another. In some embodiments, pick unit 206 may schedule instructions before all factors affecting instruction scheduling are known (e.g., instruction dependencies, implementation-specific resource hazards, etc.), in which case a picked instruction may be canceled at a later execution stage. In other embodiments, it is contemplated that other instruction selection algorithms may be employed, including algorithms that take additional instruction scheduling factors into account. Further, it is contemplated that in some embodiments, pick unit 206 may be configured to select more than two instructions for execution in a given execution cycle, or may select instructions from all threads rather than specific groups of threads. Additionally, in one embodiment pick unit 206 may be configured to identify source operand dependencies that a given picked instruction may have on a previously issued instruction, and may configure other logic to appropriately select source operands (e.g., from a register file, or from a previous execution cycle via bypass logic).

Decode unit 208 may be configured to further prepare instructions selected by pick unit 206 for execution. In the illustrated embodiment, decode unit 208 may be configured to identify the specific type of a given instruction, such as whether the instruction is an integer, floating point, load/store, or other type of instruction, as well as to identify operands required by the given instruction. Additionally, in one embodiment decode unit 208 may be configured to detect and respond to scheduling hazards not detected during operation of pick unit 206. For example, in the illustrated embodiment, only one load store unit 230 is provided. Consequently, if two load/store-type instructions were picked for execution, decode unit 208 may be configured to cancel or stall one of those instructions and allow the other to be issued. In such an embodiment, decode unit 208 may employ an arbitration algorithm to determine which instruction to issue without favoring a particular thread or thread group. Numerous other types of scheduling and resource hazards detectable by decode unit 208 are possible and contemplated.

In some embodiments, instructions from a given thread may be speculatively issued from decode unit 208 for execution. For example, a given instruction from a certain thread may fall in the shadow of a conditional branch instruction from that same thread that was predicted to be taken or not-taken, or a load instruction from that same thread that was predicted to hit in data cache 235, but for which the actual outcome has not yet been determined. In such embodiments, after receiving notice of a misspeculation such as a branch misprediction or a load miss, IFU 200 may be configured to cancel misspeculated instructions from a given thread as well as issued instructions from the given thread that are dependent on or subsequent to the misspeculated instruction, and to redirect instruction fetch appropriately.

Execution units 210*a-b* may be configured to execute and provide results for certain types of instructions issued from IFU 200. In one embodiment, each of EXUs 210 may be similarly or identically configured to execute certain integer-type instructions defined in the implemented ISA, such as arithmetic, logical, and shift instructions. In the illustrated embodiment, EXU0 210a may be configured to execute integer instructions issued from TG0, while EXU1 210b may be configured to execute integer instructions issued from TG1. Further, each of EXUs 210 may include an integer register file configured to store register state information for all threads in its respective thread group. For example, if core 100 implements eight threads 0-7 where threads 0-3 are bound to TG0 and threads 4-7 are bound to TG1, EXU0 210a may store integer register state for each of threads 0-3 while EXU1 210b may store integer register state for each of threads 4-7. It is contemplated that in some embodiments, core 100 may include more or fewer than two EXUs 210, and EXUs 210 may or may not be symmetric in functionality. Also, in some embodiments EXUs 210 may not be bound to specific thread groups or may be differently bound than just described. Finally, in the illustrated embodiment instructions destined for FGU 220 or LSU 230 pass through one of EXUs 210. However, in alternative embodiments it is contemplated that such instructions may be issued directly from IFU 200 to their respective units without passing through one of EXUs 210.

Floating point/graphics unit 220 may be configured to execute and provide results for certain floating-point and graphics-oriented instructions defined in the implemented ISA. For example, in one embodiment FGU 220 may implement single- and double-precision floating-point arithmetic instructions compliant with a version of the Institute of Electrical and Electronics Engineers (IEEE) 754 Standard for Binary Floating-Point Arithmetic (more simply referred to as the IEEE 754 standard), such as add, subtract, multiply, divide, and certain transcendental functions. Also, in one embodiment FGU 220 may implement partitioned-arithmetic and graphics-oriented instructions defined by a version of the SPARC® Visual Instruction Set (VIS™) architecture, such as VIS™ 2.0. Additionally, in one embodiment FGU 220 may implement certain integer instructions such as integer multiply, divide, and population count instructions, and may be configured to perform multiplication operations on behalf of stream processing unit 240. Depending on the implementation of FGU 220, some instructions (e.g., some transcendental or extended-precision instructions) or instruction operand or result scenarios (e.g., certain denormal operands or expected results) may be trapped and handled or emulated by software.

In the illustrated embodiment, FGU 220 may be configured to store floating-point register state information for each thread in a floating-point register file. In one embodiment, FGU 220 may implement separate execution pipelines for floating point add/multiply, divide/square root, and graphics operations, while in other embodiments the instructions implemented by FGU 220 may be differently partitioned. In various embodiments, instructions implemented by FGU 220 may be fully pipelined (i.e., FGU 220 may be capable of starting one new instruction per execution cycle), partially pipelined, or may block issue until complete, depending on the instruction type. For example, in one embodiment floating-point add operations may be fully pipelined, while floating-point divide operations may block other divide/square root operations until completed.

Load store unit 230 may be configured to process data memory references, such as integer and floating-point load and store instructions as well as memory requests that may originate from stream processing unit 240. In some embodiments, LSU 230 may also be configured to assist in the processing of instruction cache 204 misses originating from IFU 200. LSU 230 may include a data cache 235 as well as logic configured to detect cache misses and to responsively request data from L2 cache 120 via crossbar interface 260. In one embodiment, data cache 235 may be configured as a write-through cache in which all stores are written to L2 cache 120 regardless of whether they hit in data cache 235; in some such embodiments, stores that miss in data cache 235 may cause an entry corresponding to the store data to be allocated within the cache. In other embodiments, data cache 235 may be implemented as a write-back cache.

In one embodiment, LSU 230 may include a miss queue configured to store records of pending memory accesses that have missed in data cache 235 such that additional memory accesses targeting memory addresses for which a miss is pending may not generate additional L2 cache request traffic. In the illustrated embodiment, address generation for a load/store instruction may be performed by one of EXUs 210. Depending on the addressing mode specified by the instruction, one of EXUs 210 may perform arithmetic (such as adding an index value to a base value, for example) to yield the desired address. Additionally, in some embodiments LSU 230 may include logic configured to translate virtual data addresses generated by EXUs 210 to physical addresses, such as a Data Translation Lookaside Buffer (DTLB).

Stream processing unit 240 may be configured to implement one or more specific data processing algorithms in hardware. For example, SPU 240 may include logic configured to support encryption/decryption algorithms such as Advanced Encryption Standard (AES), Data Encryption Standard/Triple Data Encryption Standard (DES/3DES), or Ron's Code #4 (RC4). SPU 240 may also include logic to implement hash or checksum algorithms such as Secure Hash Algorithm (SHA-1, SHA-256), Message Digest 5 (MD5), or Cyclic Redundancy Checksum (CRC). SPU 240 may also be configured to implement modular arithmetic such as modular multiplication, reduction and exponentiation. In one embodiment, SPU 240 may be configured to utilize the multiply array included in FGU 220 for modular multiplication. In various embodiments, SPU 240 may implement several of the aforementioned algorithms as well as other algorithms not specifically described.

SPU 240 may be configured to execute as a coprocessor independent of integer or floating-point instruction issue or execution. For example, in one embodiment SPU 240 may be configured to receive operations and operands via control registers accessible via software; in the illustrated embodiment SPU 240 may access such control registers via LSU 230. In such embodiments, SPU 240 may be indirectly programmed or configured by instructions issued from IFU 200, such as instructions to read or write control registers. However, even if indirectly programmed by such instructions, SPU 240 may execute independently without further interlock or coordination with IFU 200. In another embodiment SPU 240 may receive operations (e.g., instructions) and operands decoded and issued from the instruction stream by IFU 200, and may execute in response to such operations. That is, in such an embodiment SPU 240 may be configured as an additional functional unit schedulable from the instruction stream, rather than as an independent coprocessor.

In some embodiments, SPU 240 may be configured to freely schedule operations across its various algorithmic sub-units independent of other functional unit activity. Additionally, SPU 240 may be configured to generate memory load and store activity, for example to system memory 810 described below. In the illustrated embodiment, SPU 240 may interact directly with crossbar interface 260 for such memory activity, while in other embodiments SPU 240 may coordinate memory activity through LSU 230. In one embodiment, software may poll SPU 240 through one or more control registers to determine result status and to retrieve ready results, for example by accessing additional control registers. In other embodiments, FGU 220, LSU 230 or other logic may be configured to poll SPU 240 at intervals to determine whether it has ready results to write back. In still other embodiments, SPU 240 may be configured to generate a trap when a result is ready, to allow software to coordinate result retrieval and processing.

As previously described, instruction and data memory accesses may involve translating virtual addresses to physical addresses. In one embodiment, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 204 or data cache 235. In the event no translation for a given virtual page number is found in the appropriate TLB, memory management unit 250 may be configured to provide a translation. In one embodiment, MMU 250 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk.) In some embodiments, if MMU 250 is unable to derive a valid address translation, for example if one of the memory pages including a necessary page table is not resident in physical memory (i.e., a page miss), MMU 250 may be configured to generate a trap to allow a memory management software routine to handle the translation. It is contemplated that in various embodiments, any desirable page size may be employed. Further, in some embodiments multiple page sizes may be concurrently supported.

A number of functional units in the illustrated embodiment of core 100 may be configured to generate off-core memory or I/O requests. For example, IFU 200 or LSU 230 may generate access requests to L2 cache 120 in response to their respective cache misses. SPU 240 may be configured to generate its own load and store requests independent of LSU 230, and MMU 250 may be configured to generate memory requests while executing a page table walk. Other types of off-core access requests are possible and contemplated. In the illustrated embodiment, crossbar interface 260 may be configured to provide a centralized interface to the port of crossbar 110 associated with a particular core 100, on behalf of the various functional units that may generate accesses that traverse crossbar 110. In one embodiment, crossbar interface 260 may be configured to maintain queues of pending crossbar requests and to arbitrate among pending requests to determine which request or requests may be conveyed to crossbar 110 during a given execution cycle. For example, crossbar interface 260 may implement a least-recently-used or other algorithm to arbitrate among crossbar requestors. In one embodiment, crossbar interface 260 may also be configured to receive data returned via crossbar 110, such as from L2 cache 120 or I/O interface 140, and to direct such data to the appropriate functional unit (e.g., data cache 235 for a data cache fill due to miss). In other embodiments, data returning from crossbar 110 may be processed externally to crossbar interface 260.

During the course of operation of some embodiments of core 100, exceptional events may occur. For example, an instruction from a given thread that is picked for execution by pick unit 206 may be not be a valid instruction for the ISA implemented by core 100 (e.g., the instruction may have an illegal opcode), a floating-point instruction may produce a result that requires further processing in software, MMU 250 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 270 may be configured to manage the handling of such events. For example, TLU 270 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 270 may be configured to flush all instructions from the trapping thread from any stage of processing within core 100, without disrupting the execution of other, non-trapping threads. In some embodiments, when a specific instruction from a given thread causes a trap (as opposed to a trap-causing condition independent of instruction execution, such as a hardware interrupt request), TLU 270 may implement such traps as precise traps. That is, TLU 270 may ensure that all instructions from the given thread that occur before the trapping instruction (in program order) complete and update architectural state, while no instructions from the given thread that occur after the trapping instruction (in program order) complete or update architectural state.

Exemplary Core Pipeline Diagram

In the illustrated embodiment, core 100 may be configured for pipelined execution, in which processing of new instructions may begin before older instructions have completed, such that multiple instructions from various threads may be in various stages of processing during a given core execution cycle. A pipeline diagram illustrating the flow of integer instructions through one embodiment of core 100 is shown in FIG. 3. In the illustrated embodiment, execution of integer instructions is divided into eight stages, denoted Fetch (F), Cache (C), Pick (P), Decode (D), Execute (E), Memory (M), Bypass (B), and Writeback (W). In other embodiments, it is contemplated that different numbers of pipe stages corresponding to different types of functionality may be employed. It is further contemplated that other pipelines of different structure and depth may be implemented for integer or other instructions. For example, floating-point instructions may execute in a longer pipeline than integer instructions.

The first four stages of the illustrated integer pipeline may generally correspond to the functioning of IFU 200. In one embodiment, during the Fetch stage, one or more threads to fetch may be selected, and instruction cache 204 may be accessed for the selected thread. During the Cache stage, fetch unit 202 may determine whether the access of the previous cycle hit or missed the cache. If the access hit, the instructions read from the cache may be stored in instruction buffers. During the Pick stage, pick unit 206 may be configured in one embodiment to select at most two instructions to issue, one for each thread group as described above. Source dependencies of the selected instructions on previously issued instructions may also be detected during the Pick stage. During the Decode stage, decode unit 208 may be configured to decode the selected instructions and to determine whether resource hazards exist as described above. For integer operations, data operands may also be selected during the Decode stage. For example, operands may be retrieved from an integer register file, or bypass logic may be configured to bypass operands from another pipe stage.

During the Execute stage, one or both of execution units 210 may be active to compute an instruction result. If an instruction in the integer execution pipeline is not a load or store instruction, in the illustrated embodiment it may be idle during the Memory and Bypass stages before its result is committed (i.e., written back to the integer register file) in the Writeback stage. A load or store instruction may have its address calculated by one of execution units 210 during the Execute stage. During the Memory stage of a load instruction, data cache 235 may be accessed, while during the Bypass stage, LSU 230 may determine whether a data cache hit or miss occurred. In the hit case, data may be forwarded to the appropriate execution unit 210 (e.g., dependent on the thread group of the load instruction) to be committed during the Writeback stage. In one embodiment, store instructions and load instructions that miss data cache 235 may execute with different pipeline timing than shown in FIG. 3.

In the illustrated embodiment, integer instructions are depicted as executing back-to-back in the pipeline without stalls. In execution cycles 0 through 7, instructions from threads 0, 3, 6, 2, 7, 5, 1 and 4 enter the Fetch stage, respectively, though in other embodiments, instructions may issue from various threads in a different order according to the operation of pick unit 206. In some instances, other instructions issued prior to execution cycle 0 may also be in the pipeline. Additionally, in some embodiments, two different instructions from the same or different threads may execute during the same pipeline stage. For example, in the illustrated embodiment of core 100, one integer instruction may be issued to each of execution units 210 in a single cycle.

By execution cycle 7, it is noted that each stage of the pipeline holds an instruction from a different thread in a different stage of execution, in contrast to conventional processor implementations that typically require a pipeline flush when switching between threads or processes. In some embodiments, flushes and stalls due to resource conflicts or other scheduling hazards may cause some pipeline stages to have no instruction during a given cycle. However, in the fine-grained multithreaded processor implementation employed by the illustrated embodiment of core 100, such flushes and stalls may be directed to a single thread in the pipeline, leaving other threads undisturbed. Additionally, even if one thread being processed by core 100 stalls for a significant length of time (for example, due to an L2 cache miss), instructions from another thread may be readily selected for issue, thus increasing overall thread processing throughput.

System Error Detection and Processing

During the course of operation, various types of circuits used within processor 10 may be susceptible to transient or permanent failures. As semiconductor device geometries shrink, the operating state circuits employing such devices may be susceptible to being temporarily altered by the influence of cosmic rays, nuclear particles emanating from decay of elements used in manufacturing and packaging of semiconductors, stray electromagnetic fields, or other factors. For example, a memory cell, a wire of a data or control bus, or another type of circuit may have its state temporarily inverted due to the influence of environmental radiation. Certain circuit design styles, such as high-gain or high-slew-rate designs, for example, may exacerbate such transient error susceptibility.

In addition to such transient or "soft" errors, which do not persistently alter the behavior of the affected circuit or device, permanent or "hard" errors may also arise within circuits or devices, for example due to manufacturing flaws, electrostatic discharge, thermal damage, or other causes. While soft errors may occur randomly and temporarily, hard errors are generally reproducible. However, either type of error has the potential to cause incorrect operation of processor 10 as well as any software executing within any of cores 100. For example, random corruption of a data bit of an instruction word stored in a cache memory may cause the instruction word to be interpreted as an illegal or otherwise malformed instruction, possibly resulting in an application or system crash. Corruption of data may yield incorrect computational results that may not be detected until their effects become apparent.

Consequently, in many embodiments, data elements of processor 10 that are susceptible to hard or soft errors and that may critically affect system performance may be protected with error detection and/or correction techniques. For example, in one embodiment each byte (8 bits) of a 64-bit data bus may be protected with a simple parity scheme configured to detect single-bit errors. In some embodiments, data storage elements (such as memory cells, data registers, or other elements capable of persistently storing data) may be protected with both error detection and correction circuits, such that recovery from certain types of errors may be possible. For example, each line or a subset of each line of a cache memory (e.g., L2 cache 120, instruction cache 204, or data cache 235) may be protected using an error correction code (ECC) configured to correct single bit errors and to detect double bit errors within the line or subset of the line (also referred to as Single Error Correction/Double Error Detection (SEC/DED)). Other types of error detection and/or correction techniques may also be employed. Unless otherwise indicated, the term "error detection" used alone is generally intended to refer to both techniques for detecting errors without correction and techniques for correcting errors.

In various embodiments, it is contemplated that error detection and correction techniques may be applied to data elements at different levels of granularity. Broadly speaking, a data element may encompass both data storage elements, such as memory cells, and transmission elements, such as wires, buses or other types of interconnect. Data elements may correspond to individual bit-level storage or transmission elements, or to collections or aggregations of such elements. For example, because error detection and correction logic generally adds to the complexity of a design, it may be performed on groups of signals such as bits, bytes or other groupings. Data elements may also encompass more sophisticated structures that are composed of simpler elements. For example, a data structure may include all or a portion of a random access memory (RAM) such as a cache or a random-access data buffer. A data element may also encompass content-addressable memories (CAMs), queues such as first-in, first-out or last-in, first-out queues (FIFOs and LIFOs), register files, or other data storage structures. A data element may also encompass combinational logic, whether or not used in conjunction with a data storage structure. The specific implementation of error detection and/or correction logic may vary in scope, technique and granularity according to the type of the data element being protected. For example, in some embodiments, storage elements such as caches may employ a relatively fine-grained error correction scheme (e.g., per-byte SEC/DED), while certain transmission elements such as buses may employ a less aggressive error detection scheme (e.g., parity detection per 16 or 32 bits).

In the event that a soft or hard error is detected within a data element of processor 10, in some embodiments the error may be corrected silently (e.g., invisibly to software) if the error is correctable, and reported to software or other system components to only if the error is uncorrectable (e.g., if the error occurs in a data element not protected by error correction logic, or if the number of errors present exceed the number of correctable errors). However, in other embodiments, any detected error may result in software intervention regardless of whether it is correctable.

Commonly, detected errors may be reported to software by causing an error trap or interrupt to be posted to a particular processor core, which may then begin executing a software trap handler configured to process the error condition. For example, in one embodiment each type of trap or interrupt that may occur corresponds to a respective entry within a trap vector or table, which in turn specifies the address of a corresponding trap handler to be executed. In some embodiments, different error trap handlers may be used to respond to different types of errors. For example, a trap handler invoked in response to a correctable error may coordinate the correction of the error, or may simply log the occurrence of the error, allow the underlying hardware to correct the error, and allow software interrupted by the trap to resume execution. In contrast, a trap handler invoked in response to an uncorrectable error may result in logging of the error, termination of the software executing at the time of the trap, a soft or hard system reset, or other types of interventions depending on the severity of the error.

In one embodiment, errors detected in a data element located within a particular processor core 100 may be processed by software executing on that core 100. However, in a highly integrated system such as some embodiments of processor 10, numerous data elements that are external to any processor core 100 may be susceptible to errors and protected by error detection or correction logic. Since in some embodiments, processor 10 may include several cores 100, each of which may be configured to execute a multiplicity of threads, there may be no inherent correspondence between a particular core 100 and thread and a data element external to cores 100. Nonetheless, errors that are detected in such external elements may still require appropriate processing in order to ensure the operational stability and integrity of processor 10.

Figure 4:
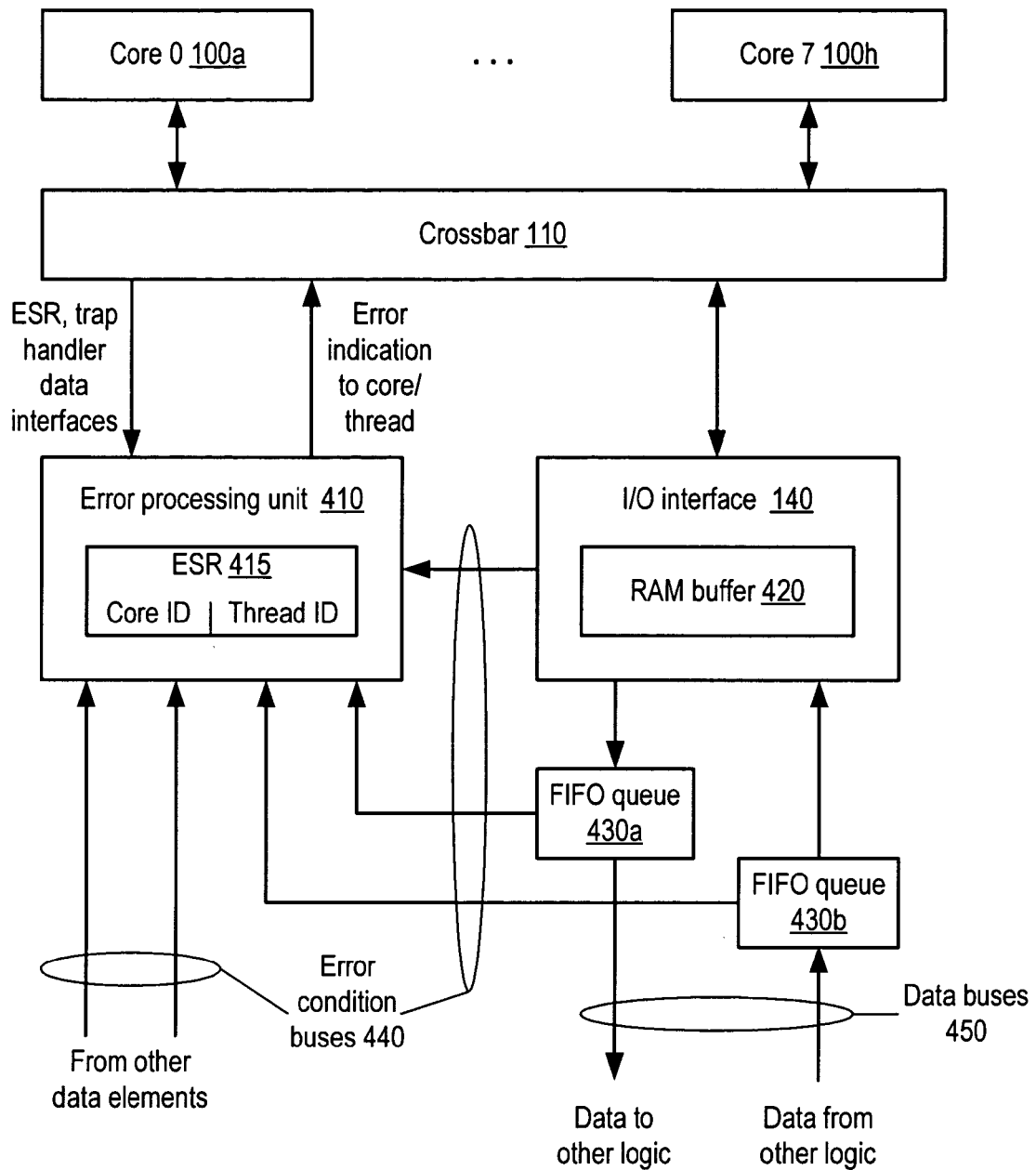
FIG. 4 is a block diagram illustrating a portion of one embodiment of processor including error processing logic for data elements external to processor cores.

A portion of one embodiment of processor 10 including error processing logic for data elements external to processor cores 100 is illustrated in FIG. 4. In the illustrated embodiment, a number of elements of processor 10 shown in FIG. 1 have been omitted for clarity, although it is understood that the embodiment shown in FIG. 4 may include those elements or other elements. In the illustrated embodiment, cores 100*a-h* and I/O interface 140 are shown coupled to crossbar 110. Additionally, processor 10 includes several FIFO queues 430*a-b* coupled to I/O interface 140. Queues 430*a-b* are coupled to various other logic sections of processor 10 (e.g., peripheral interface 150 or network interface 160 as shown in FIG. 1, or other logic units). Further, the illustrated embodiment of processor 10 includes an error processing unit (EPU) 410 coupled to crossbar 410 and coupled to I/O interface 140, queues 430 and other data elements within processor 10 via a number of error condition buses 440.

In the illustrated embodiment, I/O interface 140 includes a RAM buffer 420. For example, RAM buffer 420 may be configured to temporarily store various data items in transit between crossbar 110 and other logic connected to I/O interface 140, to store memory address translations (e.g., virtual-to-physical address translations) that may be employed during I/O data transfers, or to perform other functions including data storage requirements. Additionally, as illustrated, input to and output from I/O interface 140 may be buffered through the use of FIFO queues 430 and conveyed along data buses 450. For example, I/O interface 140 may be configured to process inbound or outbound I/O traffic at a different rate than the source or destination device for such traffic, and FIFO queues 430 may be configured to temporarily store data that may accumulate due to such processing rate differences, while preserving the order of the data.

Any of RAM buffer 420, queues 430 or data buses 450 may be susceptible to errors as described above. Correspondingly, in some embodiments error detection logic corresponding to any of these data elements may be provided, either within the data element itself, or within another unit connected to the data element. For example, in one embodiment RAM buffer 420 may include parity bits, ECC bits or other error detection logic within its entries. In such an embodiment, I/O interface 140 may be configured to check parity bits, ECC bits, etc. upon reading a given entry of RAM buffer 420 to determine whether the entry contains an error. For example, in the simple case of even or odd parity-based error detection, I/O interface 140 may perform an exclusive-OR (XOR) function on a set of data and parity bits to determine whether the number of asserted data bits is even or odd. If the actual number of asserted data bits is even, but an odd number was expected (or vice versa), an error condition may be indicated as described in greater detail below.

As just described, in one embodiment a functional unit such as I/O interface 140 may be configured to implement error detection logic on behalf of a data element included within the functional unit. However, in other embodiments, a given data element may include all of the logic necessary to both perform its intended data function and to detect and/or correct errors. For example, in the illustrated embodiment, queues 430 may be configured to autonomously check queue entries for errors and/or correct them according to the implemented error detection scheme. It is contemplated that in some embodiments, error detection for data transmission elements, such as data buses 450, may be incorporated into other data elements or functional units connected to the transmission elements, or provided as custom error detection logic attached to the transmission element. For example, in one embodiment each of data buses 450 may be protected with parity or ECC bits. In one such embodiment, FIFO queues 430 or I/O interface 140 may include additional error logic specifically configured to evaluate data buses 450 using the parity or ECC information to determine whether an error has occurred. In another embodiment, such error logic may be included in bus-checking modules (not shown) coupled to data buses 450 and distinct from queues 430, I/O interface 140 or other logic.

When an error corresponding to a particular data element is detected, in the illustrated embodiment, error processing unit 410 may be notified of the error via error condition buses 440. The information conveyed by error condition buses 440 and the specific protocol employed may vary in various embodiments. For example, in one embodiment, a given error condition bus 440 may be a simple one-bit signal that may be strobed or asserted for a given length of time to indicate that an error has occurred in a data element. In another embodiment, an error condition bus 440 may include additional information more specific to the nature of the error, such as the type of error (e.g., correctable or uncorrectable), the type of data element that generated the error, etc. In some embodiments, a functional unit such as I/O interface 140 may be configured to aggregate error reporting for each data element within the functional unit and report errors to EPU 410 via a single error condition bus 440. In one such embodiment, error condition bus 440 may be configured to convey information regarding the specific data element that generated the error, such as a unique code associated with the data element. In other embodiments, a unique error condition bus 440 may be provided for every data element that may generate an error condition, such that buses 440 implicitly identify data elements by virtue of unique correspondence. Other schemes for managing the detection and reporting of error conditions are possible and contemplated. For example, in one embodiment EPU 410 may be configured to poll various functional units or data elements to determine whether an error has occurred, rather than waiting for notification.

Once EPU 410 detects that an error corresponding to a data element has occurred, for example by receiving a notification via one or more of error condition buses 440, it may in one embodiment prepare an error trap indication to be conveyed to one of processor cores 100 for further intervention by hardware. As noted above, there may be no inherent correspondence between a data element external to cores 100 and any particular one of cores 100. Correspondingly, in the illustrated embodiment EPU 410 includes a programmable error steering register (ESR) 415 that may include information that identifies a specific core 100 to which error trap indications should be conveyed, and that further identifies a specific thread executing on the identified core that should process the error trap indication. For example, in an embodiment of processor 10 including eight cores 100 each configured to execute eight distinct threads, ESR 415 may include two three-bit data fields to encode the core 100 and thread to which error trap indications are to be directed or steered.

In one embodiment, crossbar 110 may support a generic packet-based interface for information passing to and from cores 100, in which certain packet fields have defined characteristics such as the destination of the packet, the packet type, a data payload, etc. In one such embodiment, in response to detecting an error condition, EPU 410 may be configured to assemble a packet destined for the core 100 identified within ESR 415 that includes the thread identifier stored within ESR 415, as well as any other information needed to initiate a trap on the destination core 100. EPU 410 may then submit the packet to crossbar 110 for delivery to the appropriate core 100, which may then cause the indicated thread to begin executing an appropriate error trap handler as described above. In other embodiments, EPU 410 may be configured to convey an error trap indication to the identified core 100 in a different manner. For example, in some embodiments EPU 410 may be directly connected to some or all of cores 100, rather than connected via crossbar 110, and may use a custom interface with cores 100 rather than a generic packet-based interface.

ESR 415 may be programmable to allow the arbitrary specification of the core 100 and thread that should handle error conditions detected by EPU 410. For example, in one embodiment, ESR 415 may be programmable by sufficiently privileged software, e.g., as a software-visible control register that may be written by kernel-level or more privileged software. In other embodiments, ESR 415 may be programmable via firmware, for example at reset of processor 10, through a test port interface such as a JTAG (Joint Test Action Group) interface, via a service processor, etc. By allowing the identities of the core 100 and thread to which error indications should be steered for processing to be arbitrarily programmed, EPU 410 may improve the flexibility with which such errors are handled. For example, in some embodiments, a processor 10 may ship with fewer than all cores 100 enabled due to manufacturing defects rendering certain cores 100 inoperable, for marketing purposes (e.g., to market a processor 10 with fewer resources as a distinct product category from a processor 10 having more resources) or for other reasons. Consequently, a core 100 that may be available to perform error processing in one version of processor 10 may not be available in another version. Programmability of ESR 415 may overcome such limitations and may accommodate reconfiguration that may become necessary while processor 10 is in operation (e.g., due to an in-service failure of a core 100, a need to reallocate processing resources for performance reasons, etc.).

In some embodiments, EPU 410 may be configured to include detailed information regarding a detected error within the error trap indication, such as the specific type of error, the identity of the data element affected, the actual erroneous data value, etc. However, software error handling routines may vary in their data requirements, for example according to the severity of an error. Consequently, in some embodiments, EPU 410 may support a trap handler data interface through which a software trap handler executing on the identified core 100 and thread may request more detailed information regarding an error. For example, EPU 410 may support a set of software-accessible control registers, and/or an interface to data elements themselves, through which software may retrieve additional state information corresponding to the error condition. In some embodiments, the interface presented by EPU 410 may support software writeback, such that a software trap handler may be configured to correct a data error and write the corrected value back to the data element (e.g., RAM, CAM, FIFO, etc.) corresponding to the error.

EPU 410 may not generate an error trap indication in response to every error condition indicated by error condition buses 440. Rather, in some embodiments, EPU 410 may be configured to qualify the generation of an error trap indication with other programmable state information. For example, EPU 410 may support additional status or control registers (not shown), some or all of which may be visible to and/or programmable by software. Such registers may be configured to allow the global enabling or disabling of all error reporting, or more selective error reporting. For example, in one embodiment EPU 410 may support selective enablement of reporting for errors by error type (e.g., correctable or noncorrectable), data element type, error severity (e.g., as a function of error type and data element type or identity), or other suitable criteria. If a particular error occurs that is disabled by EPU 410, that error may be masked and not indicated to the core 100 and thread identified by ESR 415. In various embodiments, masked errors may be ignored completely, or logged for later reference, e.g., in response to a software inquiry regarding logged, unreported errors.

It is noted that a particular configuration of processor 10 has been shown in FIG. 4 for illustrative purposes. However, I/O interface 140 need not necessarily include RAM buffer 420 nor interface with other logic via FIFO queues 430 as shown. In other embodiments, I/O interface 140 or other areas of processor 10 external to cores 100 may include other data elements for which error detection and/or correction may be provided. As noted above, such data elements may broadly include any suitable type of data storage or transmission elements and may employ any suitable error detection and/or correction techniques.

Figure 5:
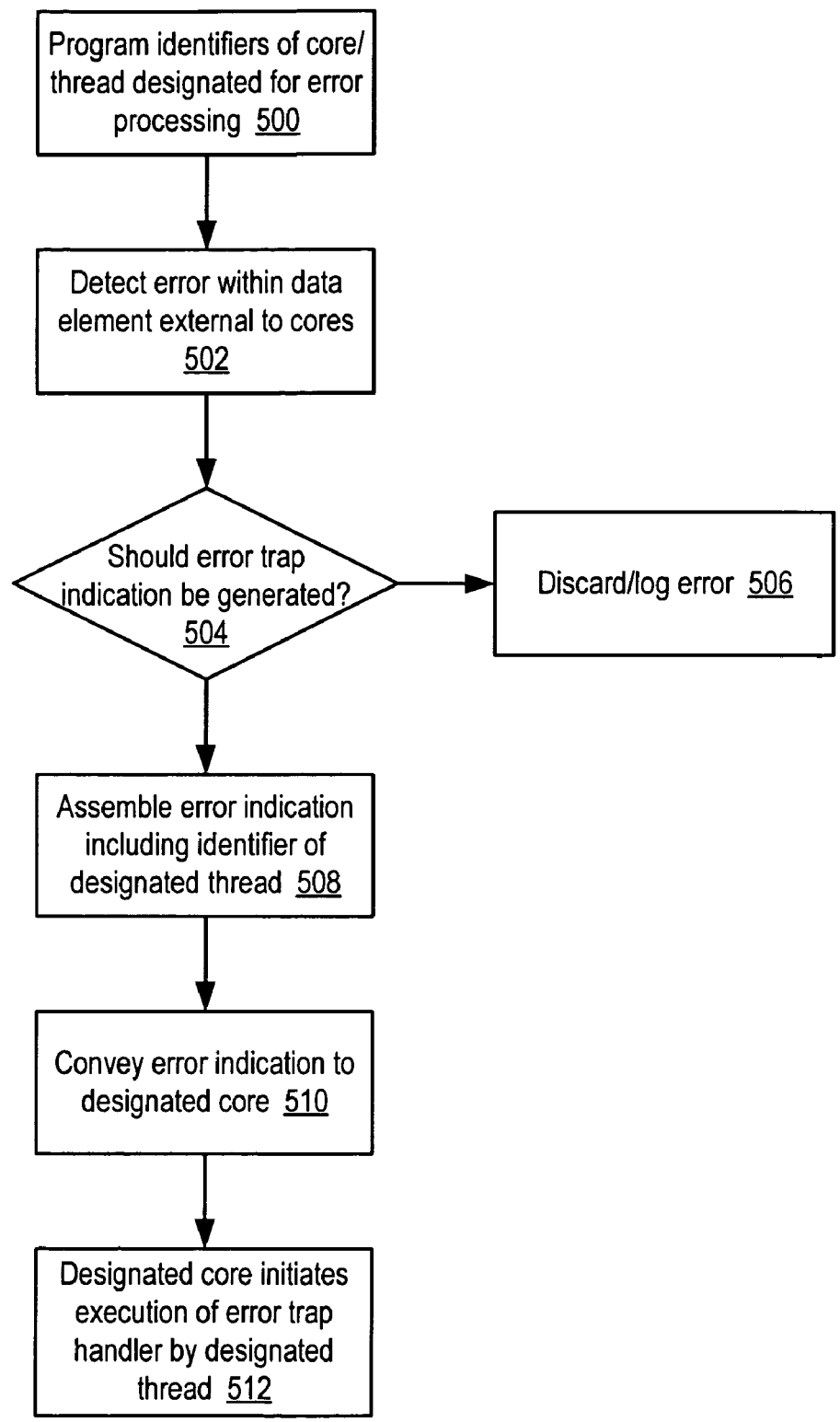
FIG. 5 is a flow diagram illustrating one embodiment of a method of error steering for errors that arise in data elements external to multithreaded cores.

One embodiment of a general method of error steering for errors that arise in data elements external to multithreaded cores 100 is illustrated in FIG. 5. Referring collectively to FIGS. 1-5, operation begins in block 500 where the identifiers of the core and thread designated for processing of such errors are programmed. For example, as described above, in one embodiment ESR 415 may be programmed by software during boot or general operation.

Subsequently, an error is detected within a data element external to cores 100 (block 502). For example, error detection and/or correction logic associated with a given data storage or transmission element may detect an error within that element. As described above, in one embodiment information describing the error may be forwarded to an error processing unit, such as EPU 410, for further processing.

The error may then be evaluated to determine whether an error trap indication should be generated (block 504). For example, as described above, the error may be qualified with certain enable or mask conditions to determine whether it should be reported. If the error should not be reported, it may be discarded and/or logged (block 506). (It is noted that in some embodiments errors may be reported unconditionally, bypassing block 504.)

Otherwise, an error indication (e.g., a packet suitable for submission to a generic packet interface, as described above) may be assembled that includes the identifier of the thread designated for error processing in block 500 (block 508), and the error condition may be conveyed to the designated core 100 (block 510). The designated core 100 may then initiate execution of an appropriate error trap handler by the indicated thread (block 512).

Exemplary System Embodiment

Figure 6:
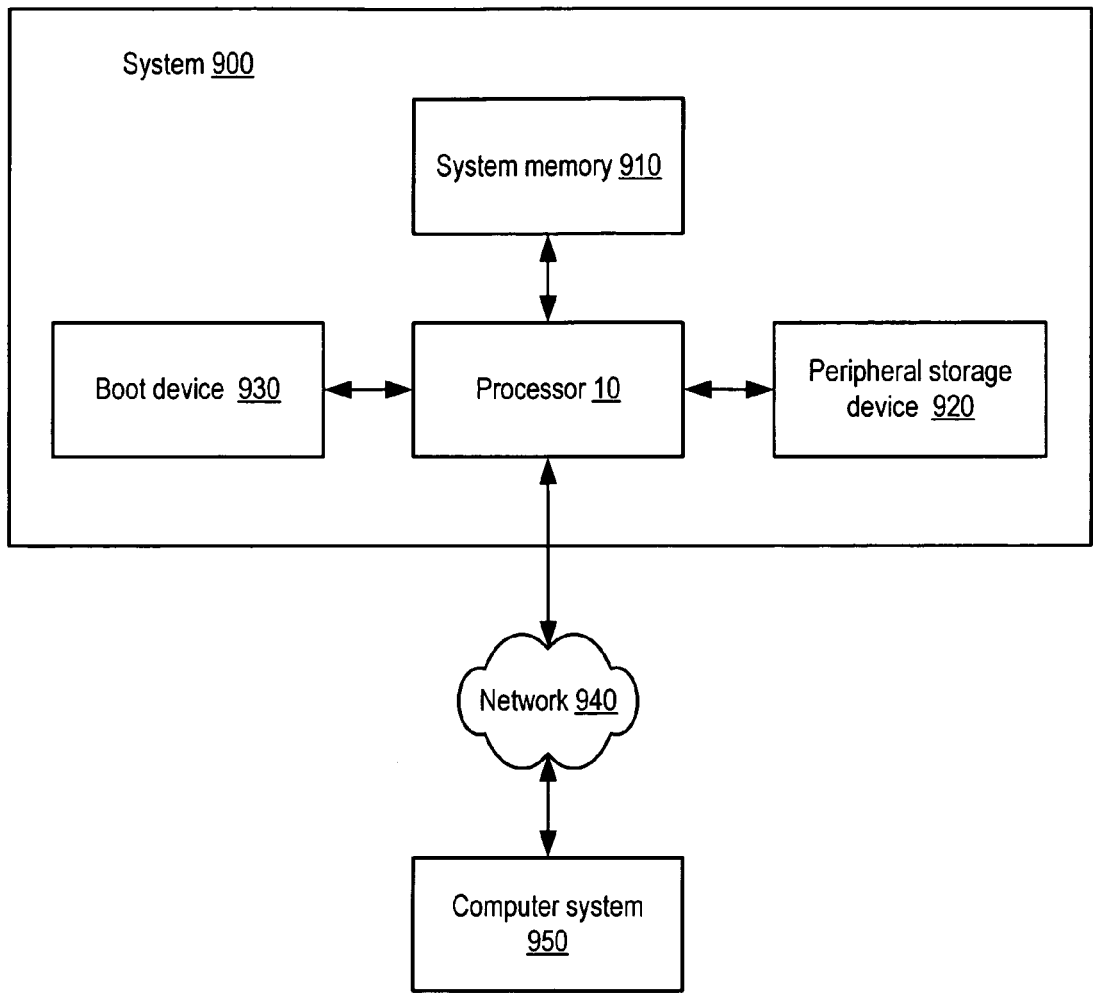
FIG. 6 is a block diagram illustrating one embodiment of a computer system.

As described above, in some embodiments processor 10 of FIG. 1 may be configured to interface with a number of external devices. One embodiment of a system including processor 10 is illustrated in FIG. 6. In the illustrated embodiment, system 900 includes an instance of processor 10 coupled to a system memory 910, a peripheral storage device 920 and a boot device 930. System 900 is coupled to a network 940, which is in turn coupled to another computer system 950. In some embodiments, system 900 may include more than one instance of the devices shown, such as more than one processor 10, for example. In various embodiments, system 900 may be configured as a rack-mountable server system, a standalone system, or in any other suitable form factor. In some embodiments, system 900 may be configured as a client system rather than a server system.

In various embodiments, system memory 910 may comprise any suitable type of system memory as described above, such as FB-DIMM, DDR/DDR2 SDRAM, or RDRAM®, for example. System memory 910 may include multiple discrete banks of memory controlled by discrete memory interfaces in embodiments of processor 10 configured to provide multiple memory interfaces 130. Also, in some embodiments system memory 910 may include multiple different types of memory.

Peripheral storage device 920, in various embodiments, may include support for magnetic, optical, or solid-state storage media such as hard drives, optical disks, nonvolatile RAM devices, etc. In some embodiments, peripheral storage device 920 may include more complex storage devices such as disk arrays or storage area networks (SANs), which may be coupled to processor 10 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 10, such as multimedia devices, graphics/display devices, standard input/output devices, etc.

As described previously, in one embodiment boot device 930 may include a device such as an FPGA or ASIC configured to coordinate initialization and boot of processor 10, such as from a power-on reset state. Additionally, in some embodiments boot device 930 may include a secondary computer system configured to allow access to administrative functions such as debug or test modes of processor 10.

Network 940 may include any suitable devices, media and/or protocol for interconnecting computer systems, such as wired or wireless Ethernet, for example. In various embodiments, network 940 may include local area networks (LANs), wide area networks (WANs), telecommunication networks, or other suitable types of networks. In some embodiments, computer system 950 may be similar to or identical in configuration to illustrated system 900, whereas in other embodiments, computer system 950 may be substantially differently configured. For example, computer system 950 may be a server system, a processor-based client system, a stateless "thin" client system, a mobile device, etc.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. An integrated circuit, comprising:
   a plurality of processor cores, wherein each of said processor cores is associated with a respective plurality of threads, and wherein each of said processor cores is configured to issue a first instruction from one of said respective plurality of threads during one execution cycle and to issue a second instruction from another one of said respective plurality of threads during a successive execution cycle; and
   an error processing unit coupled to said processor cores and configured to detect an error condition corresponding to a data element external to said plurality of processor cores, wherein for any given error condition corresponding to the data element, detection of the given error condition occurs independent from operation of said processor cores;
   wherein, in response to detecting said error condition, said error processing unit is further configured to convey an indication of said error condition to a selected one of said processor cores dependent upon an identifier of said selected processor core, wherein said indication includes an identifier of a selected thread executable on said selected processor core; and
   wherein said identifiers of said selected processor core and said selected thread are programmable such that:
      for each given detected error condition that is reportable, said error processing unit is configured to convey an indication of said given detected error condition to said selected processor core and said selected thread; and after identifiers of said selected processor core or said selected thread are programmed that differ from previously programmed identifiers, said error processing unit is configured to convey said indication of said given detected error condition to a different selected processor core or a different selected thread, wherein the different selected processor core is distinct from a previously selected processor core, and wherein the different selected thread is distinct from a previously selected thread, such that on different occasions, said error processing unit is configured to send a same indication of a same detected error condition to different ones of said processor cores or said threads, depending on how said identifiers of said selected processor core and said selected thread are programmed.

2. The integrated circuit as recited in claim 1, wherein said indication of said error condition includes an error trap indication, and wherein in response to receiving said error trap indication, said selected processor core is configured to execute an error trap handler associated with said selected thread.

3. The integrated circuit as recited in claim 1, wherein said data element includes a data transmission element.

4. The integrated circuit as recited in claim 1, wherein said data element includes a data storage element.

5. The integrated circuit as recited in claim 4, wherein said data storage element includes a random access memory (RAM).

6. The integrated circuit as recited in claim 4, wherein said data storage element includes a content-addressable memory (CAM).

7. The integrated circuit as recited in claim 4, wherein said data storage element includes one of a first-in, first-out (FIFO) queue or a last-in, first-out (LIFO) queue.

8. The integrated circuit as recited in claim 1, wherein said error processing unit includes an error steering register configured to store said identifiers of said selected processor core and said selected thread, and wherein said error steering register is software programmable.

9. The integrated circuit as recited in claim 1, wherein said error processing logic is coupled to said plurality of processor cores via a packet-based interface, wherein said error processing logic conveying said indication of said error condition to said selected processor core includes said error processing logic conveying a packet including an indication of said identifier of said selected thread to said selected processor core via said packet-based interface.

10. A method, comprising:
selecting one of a plurality of processor cores to perform processing of an error condition occurring in a data element external to said plurality of processor cores, wherein each of said processor cores is associated with a respective plurality of threads, and wherein each of said processor cores is configured to issue a first instruction from one of said respective plurality of threads during one execution cycle and to issue a second instruction from another one of said respective plurality of threads during a successive execution cycle;
selecting one of said respective plurality of threads associated with said selected processor core to perform processing of said error condition;
programming respective identifiers of said selected processor core and said selected thread, such that for each given detected error condition that is reportable, an indication of said given detected error condition is conveyed to said selected processor core and said selected thread, and such that after identifiers of said selected processor core or said selected thread are programmed that differ from previously programmed identifiers, said indication of said given detected error condition is conveyed to a different selected processor core or a different selected thread, wherein the different selected processor core is distinct from a previously selected processor core, and wherein the different selected thread is distinct from a previously selected thread;
detecting said error condition corresponding to said data element external to said plurality of processor cores, wherein for any given error condition corresponding to the data element, detecting the error condition occurs independent from operation of said processor cores; and
conveying an indication of said error condition to said selected processor core dependent upon said programmed respective identifier of said selected processor core, such that on different occasions, a same indication of a same detected error condition is conveyed to different ones of said processor cores or said threads, depending on how said identifiers of said selected processor core and said selected thread are programmed.

11. The method as recited in claim 10, wherein said indication of said error condition includes an error trap indication, and wherein in response to receiving said error trap indication, said selected processor core is configured to execute an error trap handler associated with said selected thread.

12. The method as recited in claim 10, wherein said data element includes a data transmission element.

13. The method as recited in claim 10, wherein said data element includes a data storage element.

14. The method as recited in claim 13, wherein said data storage element includes a random access memory (RAM).

15. The method as recited in claim 13, wherein said data storage element includes a content-addressable memory (CAM).

16. The method as recited in claim 13, wherein said data storage element includes one of a first-in, first-out (FIFO) queue or a last-in, first-out (LIFO) queue.

17. The method as recited in claim 10, wherein programming said respective identifiers of said selected processor core and said selected thread includes executing software on one of said processor cores to program an error steering register configured to store said identifiers of said selected processor core and said selected thread.

18. The method as recited in claim 10, wherein conveying said indication of said error condition to said selected processor core includes conveying a packet including an indication of said identifier of said selected thread to said selected processor core via a packet-based interface.

19. A system, comprising:
a system memory; and
a processor coupled to said system memory, wherein said processor includes:
a plurality of processor cores, wherein each of said processor cores is associated with a respective plurality of threads, and wherein each of said processor cores is configured to issue a first instruction from one of said respective plurality of threads during one execution cycle and to issue a second instruction from another one of said respective plurality of threads during a successive execution cycle; and
an error processing unit coupled to said processor cores and configured to detect an error condition corresponding to a data element external to said plurality of processor cores, wherein for any given error condition corresponding to the data element, detection of the given error condition occurs independent from operation of said processor cores;

wherein, in response to detecting said error condition, said error processing unit is further configured to convey an indication of said error condition to a selected one of said processor cores dependent upon an identifier of said selected processor core, wherein said indication includes an identifier of a selected thread executable on said selected processor core; and wherein said identifiers of said selected processor core and said selected thread are programmable such that:
for each given detected error condition that is reportable, said error processing unit is configured to convey an indication of said given detected error condition to said selected processor core and said selected thread; and
after identifiers of said selected processor core or said selected thread are programmed that differ from previously programmed identifiers, said error processing unit is configured to convey said indication of said given detected error condition to a different selected processor core or a different selected thread, wherein the different selected processor core is distinct from a previously selected processor core, and wherein the different selected thread is distinct from a previously selected thread, such that on different occasions, said error processing unit is configured to send a same indication of a same detected error condition to different ones of said processor cores or said threads, depending on how said identifiers of said selected processor core and said selected thread are programmed.

20. The processor as recited in claim 19, wherein said indication of said error condition includes an error trap indication, and wherein in response to receiving said error trap indication, said selected processor core is configured to execute an error trap handler associated with said selected thread.

* * * * *

UNITED STATES PATENT AND TRADEMARK OFFICE
CERTIFICATE OF CORRECTION

| | | |
|---|---|---|
| PATENT NO. | : 7,716,521 B1 | Page 1 of 1 |
| APPLICATION NO. | : 11/123674 | |
| DATED | : May 11, 2010 | |
| INVENTOR(S) | : Hunter S. Donahue et al. | |

It is certified that error appears in the above-identified patent and that said Letters Patent is hereby corrected as shown below:

In column 13, line 17, before "only" delete "to".

Signed and Sealed this
Fifth Day of July, 2011

David J. Kappos
*Director of the United States Patent and Trademark Office*